United States Patent

Kranig et al.

[11] Patent Number: 5,574,112
[45] Date of Patent: Nov. 12, 1996

[54] PROCESS FOR THE PREPARATION OF POWDER COATINGS OF EPOXIDE RESIN, POLYMERIC POLYCARBOXYLIC ACID AND POLYOL

[76] Inventors: Wolfgang Kranig, Erlengrund 42, 48308 Senden; Klaus Cibura, Am Schütthook 159, 48167 Münster; Joachim Woltering, Rudolphstrasse 24, 48145 Münster; Christopher Hilger, Goebenstrasse 33, 48151 Münster, all of Germany

[21] Appl. No.: 379,520
[22] PCT Filed: Aug. 10, 1993
[86] PCT No.: PCT/EP93/02122
 § 371 Date: Mar. 6, 1995
 § 102(e) Date: Mar. 6, 1995
[87] PCT Pub. No.: WO94/04590
 PCT Pub. Date: Mar. 3, 1994

[30] Foreign Application Priority Data

Aug. 20, 1992 [DE] Germany ............... 42 27 580.6

[51] Int. Cl.⁶ ............... C08L 33/14; C08L 63/02
[52] U.S. Cl. ............... 525/327.3; 525/449; 525/934
[58] Field of Search ............... 525/327.3, 533, 525/449, 934

[56] References Cited

U.S. PATENT DOCUMENTS

| | | | |
|---|---|---|---|
| 3,759,954 | 9/1973 | Batzer et al. | 528/103 |
| 3,956,241 | 5/1976 | Steele et al. | 528/92 |
| 4,091,048 | 5/1978 | Labana et al. | 525/186 |
| 4,092,373 | 5/1978 | Siwiec et al. | 525/207 |
| 5,013,791 | 5/1991 | Kerr et al. | 525/113 |

FOREIGN PATENT DOCUMENTS

| | | |
|---|---|---|
| 0 299 420 A3 | 7/1988 | European Pat. Off. . |
| 2908700A1 | 3/1979 | Germany . |

OTHER PUBLICATIONS

Patent Abstracts of Japan, Jul. 6, 1992, 1–2 vol. 16 No. 304 (C–959) (5347) for Japanese Patent No. 4–85332, Mar. 1992.

*Primary Examiner*—Robert E. Sellers

[57] ABSTRACT

The invention relates to a process for the preparation of powder coatings, in which a mixture of A) a binder comprising an epoxide group-containing synthetic resin or a mixture of epoxide group-containing synthetic resins, and B) a crosslinking agent comprising a compound which contains on statistical average at least two carboxyl groups and at least one acid anhydride group per molecule, or a mixture of such compounds, is admixed before or during the melt homogenization process with C) a polyol or a mixture of polyols in such an amount that from 0.1 to 0.9 hydroxyl groups of component C) are present per acid anhydride group of component B).

The mixture is homogenized in the molten state and the resulting homogenized melt, after having cooled and solidified, is powdered.

2 Claims, No Drawings

PROCESS FOR THE PREPARATION OF POWDER COATINGS OF EPOXIDE RESIN, POLYMERIC POLYCARBOXYLIC ACID AND POLYOL

The invention relates to a process for the preparation of powder coatings, in which a mixture of A) a binder comprising an epoxide group-containing synthetic resin or a mixture of epoxide group-containing synthetic resins, and B) a crosslinking agent comprising a compound which contains on statistical average at least two carboxyl groups and at least one acid anhydride group per molecule, or a mixture of such compounds, is homogenized in the molten state and the resulting homogenized melt, after having cooled and solidified, is pulverized.

The invention also relates to powder coatings prepared by this process.

The process described above is known (cf. e.g. U.S. Pat. No. 4,091,048, DE-A-2 214 650 and EP-A-299 420.

EP-A-299 420 discloses a process for the preparation of powder coatings of the type described above, which is intended to enable the preparation of powder coatings which are stable on storage and give coating films having good properties. The process described in EP-A-299 420 is distinguished in that the compound employed as component B) has been modified by reaction with a polyol and contains on statistical average at least two carboxyl groups and at least two acid anhydride groups per molecule. The powder coatings prepared by this process give coating films whose properties, in particular for application in automotive finishing, are in need of improvement.

The object of the present invention consists in the provision of a process for the preparation of powder coatings of the type described at the beginning which enables the preparation of powder coatings which, in comparison with the powder coatings of the prior art, give coating films having improved properties. This object is surprisingly achieved by a process of the type described at the beginning which is characterized in that the mixture of A) and B) is admixed before or during the melt homogenization process with C) a polyol or a mixture of polyols in such an amount that from 0.1 to 0.9, preferably from 0.3 to 0.6, hydroxyl groups of component C) are present per acid anhydride group of component B).

The powder coatings prepared by the process according to the invention are distinguished from powder coatings of the prior art in that they give coating films having improved adhesion (especially when used as clear coats for two-coat automotive finishes) and improved resistance to premium-grade gasoline and methyl ethyl ketone.

Powder coatings are conventionally prepared by homogenizing a mixture of components A) and B) in the molten state and powdering the thus resulting homogenized melt after it has cooled and solidified. The process of melting and homogenizing the mixture of components A) and B) is termed the melt homogenization process. It is usually carried out by extruding the mixture. Depending on the desired powder coating formulation, the mixture of components A) and B) can be admixed before or during the melt homogenization process with further conventional powder coating constituents, such as, for example, one or more crosslinking catalysts (for example quaternary ammonium salts, quaternary phosphonium salts, phosphines, imidazolines and metal salts, cf. also EP-A-299 420, page 4, line 51 and line 52), one or more pigments, one or more light stabilizers, one or more degassing agents (for example benzoin), one or more leveling assistants (cf. e.g. EP-A-299 420, page 5, line 7 to 14), one or more additional binders, one or more additional crosslinking agents etc. The melt obtained at the end of the melt homogenization process is powdered after it has cooled and solidified.

The process described above for the preparation of powder coatings is well known and requires no further discussion (cf. e.g. also H. Kittel, Lehrbuch der Lacke und Beschichtungen [Textbook of Paints and Coatings], Volume VIII, Part 2, Verlag W. A. Colomb in Heenemann Verlagsgesellschaft mbH, Berlin and Oberschwandorf, 1980).

It is essential to the invention that the mixture of components A) and B) is admixed before or during the melt homogenization process with C) a polyol or a mixture of polyols in an amount such that from 0.1 to 0.9, preferably from 0.3 to 0.6, hydroxyl groups of component C) are present per acid anhydride group of component B). Component C) is preferably added to the mixture of components A) and B) before the beginning of the melt homogenization process. If component C) is added during the melt homogenization process, it must then be ensured that the addition is made at a suitable point in time such that there is still sufficient time for homogeneous incorporation of component C).

The duration of the melt homogenization process and the temperatures to be employed depend on a number of parameters (for example on the nature of the machine employed, on the glass transition temperature of the binder, etc.), and the person skilled in the art—as is also the case in the processes of the prior art—must optimize these parameters with the aid of routine experiments. The mixture to be homogenized should in general not be heated above 130° C., preferably not above 120° C. and particularly preferably not above 110° C., during the melt homogenization process.

In the process according to the invention component A) can, in principle, be any epoxide group-containing synthetic resin which can be employed for the preparation of powder coatings, or a mixture of such synthetic resins. Examples of epoxide group-containing synthetic resins which can be employed are epoxide group-containing polyacrylate resins, polyglycidyl ethers of aliphatic or cycloaliphatic alcohols, such as, for example, ethylene glycol, diethylene glycol, 1,2-propylene glycol, 1,4-butylglycol, 1,2-cyclohexanediol, 1,4 cyclohexanediol, 1,2-bis(hydroxy-methyl)cyclohexane and hydrogenated bisphenol A, polyglycidyl ethers of polyphenols such as, for example, bisphenol A, 1,1-bis(4-hydroxyphenyl)ethane and 2-methyl-1,1-bis(4-hydroxyphenyl)propane and the epoxide group-containing compounds which are listed in U.S. Pat. No. 4,102,942 in column 3, line 1 to 16.

Component A) employed is preferably an epoxide group-containing polyacrylate resin or a mixture of epoxide group-containing polyacrylate resins.

An epoxide group-containing polyacrylate resin is understood to mean a polymer which can be prepared by copolymerization of at least one ethylenically unsaturated monomer containing at least one epoxide group in the molecule with at least one further ethylenically unsaturated monomer containing no epoxide group in the molecule, at least one of the monomers being an ester of acrylic acid or methacrylic acid. Epoxide group-containing polyacrylate resins are known (cf. e.g. EP-A-299 420, DE-B-22 14 650, U.S. Pat. No. 4,091,048 and U.S. Pat. No. 3,781,379).

Examples of ethylenically unsaturated monomers containing at least one epoxide group in the molecule are glycidyl acrylate, glycidyl methacrylate and allyl glycidyl ether.

Examples of ethylenically unsaturated monomers containing no epoxide group in the molecule are alkyl esters of acrylic and methacrylic acid which contain 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxide groups in the molecule are acids such as, for example, acrylic acid and methacrylic acid, aromatic vinyl compounds such as styrene and vinyltoluene, nitriles such as acrylonitrile and methacrylonitrile, vinyl and vinylidene halides, such as vinyl chloride and vinylidene fluoride, vinyl esters, for example vinyl acetate, and hydroxyl group-containing monomers, such as for example hydroxyethyl acrylate and hydroxyethyl methacrylate. When the polyacrylate resins are prepared using monomers which carry functional groups which are potentially capable of reacting with the epoxy groups, it must be ensured that the amounts in which the monomers are employed, or the reaction conditions chosen, are such that self-crosslinking of the polyacrylate resin either does not occur at all or only occurs to a slight extent.

The epoxide group-containing polyacrylate resin usually has an epoxide equivalent weight of from 350 to 2000, preferably from 450 to 1500 and particularly preferably from 500 to 1350, a number-average molecular weight (determined by gel permeation chromatisim [sic] using a polystyrene standard) of from 500 to 100,000, preferably from 500 to 20,000, particularly preferably from 1000 to 10,000 and very particularly preferably from 1000 to 5000, and a glass transition temperature ($T_G$) of from 30° to 80° C., preferably from 35° to 70° C. and particularly preferably from 40° to 60° C.

The epoxide group-containing polyacrylate resin can be prepared according to generally well-known methods, by free radical polymerization.

In the process according to the invention component B) can, in principle, be any compound which contains on statistical average at least two carboxyl groups and at least one acid anhydride group per molecule, or a mixture of such compounds. Component B) is in particular polymeric anhydrides of polycarboxylic acids, preferably polymeric anhydrides of dicarboxylic acids and particularly preferably polymeric anhydrides of cycloaliphatic or aliphatic dicarboxylic acids, the dicarboxylic acids containing from 3 to 20, preferably from 6 to 12 carbon atoms per molecule, or mixtures of such polymeric anhydrides. Specific examples of particularly preferred polymeric anhydrides are poly(adipic anhydride), poly(azeleic anhydride), poly(sebacic anhydride) and poly(dodecanedioic anhydride), and polymeric anhydrides derived from mixtures of adipic acid and/or azeleic acid and/or sebacic acid and/or dodecanedioic acid. Component B) is very particularly preferably poly(dodecanedioic anhydride).

Components A) and B) are mixed together in such a quantitative ratio that from 1.5 to 0.5, preferably from 1.3 to 0.7 and particularly preferably from 1.2 to 0.8 equivalents of carboxyl groups of component B) are present per equivalent of epoxide groups of component A).

In the process according to the invention component C) can, in principle, be any polyol or a mixture of polyols. A polyol is understood to mean an organic compound which contains on statistical average more than one hydroxyl group per molecule. The polyols preferably employed as component C) contain on statistical average at least two hydroxyl groups per molecule. Examples of polyols which can be used as component C) are low molecular weight polyols, such as for example trimethylolpropane, pentaerythritol, hexanediol, 2,2-dimethylolpropionic acid, glycerol, sorbitol etc., and higher molecular weight polyols such as, for example, polyester-polyols, polyether-polyols, polyurethane-polyols, cellulose acetobutyrate, polycaprolactone-polyol etc. Component C) is preferably trimethylolpropane, hexanediol, 2,2-dimethylolpropionic acid, pentaerythritol, or a mixture of these polyols. Component C) is very particularly preferably trimethylolpropane.

The powder coatings prepared by the process according to the invention can be applied to any desired substrates, for example metal, glass or plastic, using application methods suitable for powder coatings, preferably an electrostatic method. The powder coatings prepared by the process according to the invention are particularly suitable as powder clear coats for the preparation of the clear coat in two-coat finishes which can be obtained by initially applying a pigmented base coat, preferably one pigmented with metal flakes, for example aluminum flakes, and applying a powder clear coat over the base coat thus obtained. Suitable base coats are not only water-thinnable base coats but also base coats containing exclusively organic solvents and/or diluents. Such two-coat finishes are employed in particular in automotive finishing, for example in the preparation of metallic effect finishes.

The powder coatings prepared by the process according to the invention are usually baked at from 130° to 180° C.

The invention is described in more detail in the examples which follow. All parts and percentages are by weight unless expressly stated otherwise.

1. Preparation of component A)

A mixture of 37.06 parts by weight of methyl methacrylate, 14.40 parts by weight of glycidyl methacrylate, 9.00 parts by weight of n-butyl acrylate and 6.54 parts by weight of styrene are added at 120° C. over a period of 4 hours to 30.0 parts by weight of xylene. Commencing with the addition of the monomer mixture 3.0 parts of tert-butyl per-2-ethylhexanoate (TBPEH; manufacturer: Peroxid-Chemie) are added over a period of 4.5 hours. During the addition of the monomer mixture and of the peroxide the reaction temperature is 120° C. This temperature is maintained for a further hour after having completed the addition of the peroxide. The xylene is then removed under reduced pressure, and the synthetic resin is heated to 180° C. and discharged from the reaction vessel.

2. Preparation of component B)

67.2 parts by weight of dodecanedioic acid together with 29.8 parts by weight of acetic anhydride are weighed out and charged to a reaction vessel fitted with a reflux condenser. The mixture is heated slowly until reflux begins and left for 3 hours under reflux. The acetic acid which has formed is then distilled off. A further 3.00 parts by weight of acetic anhydride are then added to the reaction product, and the mixture is heated for one hour at reflux temperature. Finally the acetic acid which has formed is distilled off and the reaction product is discharged from the reaction vessel at 90°.

3. Preparation according to the invention of a powder coating 1095 parts by weight of component A) prepared as in section 1. are comminuted and premixed in a precutting mill together with 303 parts by weight of component B) prepared as in section 2., 23.8 parts by weight of trimethylolpropane (component C)), 5.9 parts by weight of benzoin, 5.9 parts by weight of a leveling assistant (Perenol® F40, manufacturer:

Henkel KGaA) 35.4 parts by weight of a first light stabilizer (Tinuvin® 900, manufacturer: Ciba Geigy) and 23.6 parts by weight of a second light stabilizer (Tinuvin® 144, manufacturer: Ciba Geigy). The resulting mixture is then extruded in a Buss Ko-kneader (type PLK 46) at 60 revolutions/min, the temperature in the center of the extrusion chamber being 90°–110° C. The extrudate is cooled rapidly to room temperature, milled in an impact mill (ACM 2L from Hosokawa MikroPul) to a powder having an average particle diameter of from 30–40 μm, and screened through a sieve having a pore size of 125 μm.

4. Production of a two-coat finish

A commercial, water-thinnable base coat containing polyurethane, polyester and melamine resin and pigmented with aluminum flakes is applied to a phosphatized steel panel coated with a commercial electrodeposition coating and a commercial filler so that a dry film thickness of from 12 to 15 μm is obtained. The applied base coat is dried for 10 minutes at room temperature and 10 minutes at 80° C. The steel panel coated in this way is then coated electrostatically with the powder coating prepared as in section 3. so that a film thickness of from 50 to 60 μm is obtained. The base coat and powder clear coat are finally baked for 20 minutes at 160° C.

5. Comparative Example

The procedure as described under section 1. to 4. is followed with the sole exception that the trimethylolpropane (component C)) is reacted in a preliminary reaction with component B). 874 parts by weight of component B) prepared as in section 2. together with 97.8 parts by weight of trimethylolpropane are added and the reaction mixture is held for 1.5 hours at 130° C. 303 parts by weight of this reaction product are then comminuted and premixed in a precutting mill, as described under section 3., together with 1095 parts by weight of component A) prepared as in section 1., 5.9 parts by weight of benzoin, 5.9 parts by weight of a leveling assistant (Perenol® F40, manufacturer: Henkel KGaA) 35.4 parts by weight of a first light stabilizer (Tinuvin® 900, manufacturer: Ciba Geigy AG) and 23.6 parts by weight of a second light stabilizer (Tinuvin® 144; manufacturer: Ciba Geigy AG). The resulting mixture is extruded as described under section 3. and milled to a powder. Coating 10 films prepared in analogy to section 4. exhibit a poorer adhesion and a significantly poorer resistance to premium-grade gasoline and methyl ethyl ketone than the coating films prepared using the powder coating prepared in accordance with the invention.

We claim:

1. Process for the preparation of powder coatings, comprising the steps of homogenizing, in the molten state, a mixture of:

A) a binder selected from the group consisting of epoxide group-containing synthetic resins and mixtures thereof, and B) a crosslinking agent selected from the group consisting of compounds which contain on statistical average at least two carboxyl groups and at least one acid anhydride group per molecule, and mixtures of such compounds, and cooling and solidifying the resulting homogenized melt to form a solidified coating, then reducing the solidified coating to a powder, wherein the mixture of A) and B) is admixed before or during the melt homogenization process with:

C) a compound selected from the group of polyols consisting of hexanediol, 2,2-dimethylolproprionic acid, trimethylolpropane, pentaerythritol and mixtures thereof in such an amount that from 0.1 to 0.9 hydroxyl groups of component C) are present per acid anhydride group of component B).

2. Powder coatings prepared according to the process of claim 1.

* * * * *